(12) United States Patent
Nagy et al.

(10) Patent No.: US 6,721,761 B2
(45) Date of Patent: Apr. 13, 2004

(54) SYSTEM FOR ASSIGNING DIGITAL IDENTIFIERS TO TELEPHONE NUMBERS AND IP NUMBERS

(75) Inventors: Balázs Nagy, Littleton, CO (US); Michelle Mari Mace, Golden, CO (US); Yinghui Yu, Lakewood, CO (US)

(73) Assignee: American Management Systems, Inc., Fairfax, VA (US)

( * ) Notice: Subject to any disclaimer, the term of this patent is extended or adjusted under 35 U.S.C. 154(b) by 411 days.

(21) Appl. No.: 09/739,767

(22) Filed: Dec. 20, 2000

(65) Prior Publication Data

US 2002/0087502 A1 Jul. 4, 2002

(51) Int. Cl.[7] .................................................. G06F 17/30
(52) U.S. Cl. ....................................... 707/104.1; 707/10
(58) Field of Search ................................ 707/10, 104.1; 379/45, 112.05, 112.06, 201.01, 201.02, 221.13, 134; 370/351, 352; 358/1.9; 709/227

(56) References Cited

U.S. PATENT DOCUMENTS 6,002,757 A * 12/1999 Williams et al. ......... 379/201.01
6,172,769 B1 * 1/2001 Rao et al. .................... 358/1.9
6,359,976 B1 * 3/2002 Kalyanpur et al. ......... 379/134

OTHER PUBLICATIONS

David Crowe, TelecomClick, Much Ado About Numbers, Wireless Review, May 15, 1999, pp. 1–3.

006055955 Colorado PUC Orders Rate Center Consolidation in Denver, State & Local Communications Report, May 22, 1988, vol.: 16 Issue: 10 Document Type: Newsletter Publisher: BRP Publications, Language: English Word Count: 584 Record Type: Full Text.

00646666 Telecos Pan Number Pooling, But CLEC Want Rapid Rollout, Telecommunications Reports, Jan. 4, 1999, vol.: 65 Issue: I Document Type: Newsletter Language: English Word Count: 563 Record Type: Fulltext.

00651931 Mobile Service Threatened By Wireline Regulatory Tar Pit Communications Today, Feb. 1, 1999 Document Type: Newsletter Publisher: Phillips Business Information Language: English Word Count: 942 Record Type: Fulltext.

* cited by examiner

Primary Examiner—Diane D. Mizrahi
Assistant Examiner—Apu M Mofiz
(74) Attorney, Agent, or Firm—Staas & Halsey LLP

(57) ABSTRACT

A system and method includes a retrieving unit dynamically retrieving one or more points from a database, wherein the points are one of telephone numbers, cable numbers, and IP address numbers. A group of points mapping unit dynamically maps the one or more points to one or more groups of points and dynamically orders each group of points to a calling group of points and a receiving group of points. A zone creator unit dynamically identifies the one or more groups of points having same calling areas and dynamically generates therefrom one or more local zones. An assignment unit dynamically assigns an identifier to each calling group of points and each receiving group of points in each local zone. A rule generator dynamically generates local calling rules by concatenating the identifiers assigned to the calling group of points and to the receiving group of points in each local zone. A data transfer unit transfers the local calling rules to a rule database for billing purposes.

55 Claims, 7 Drawing Sheets

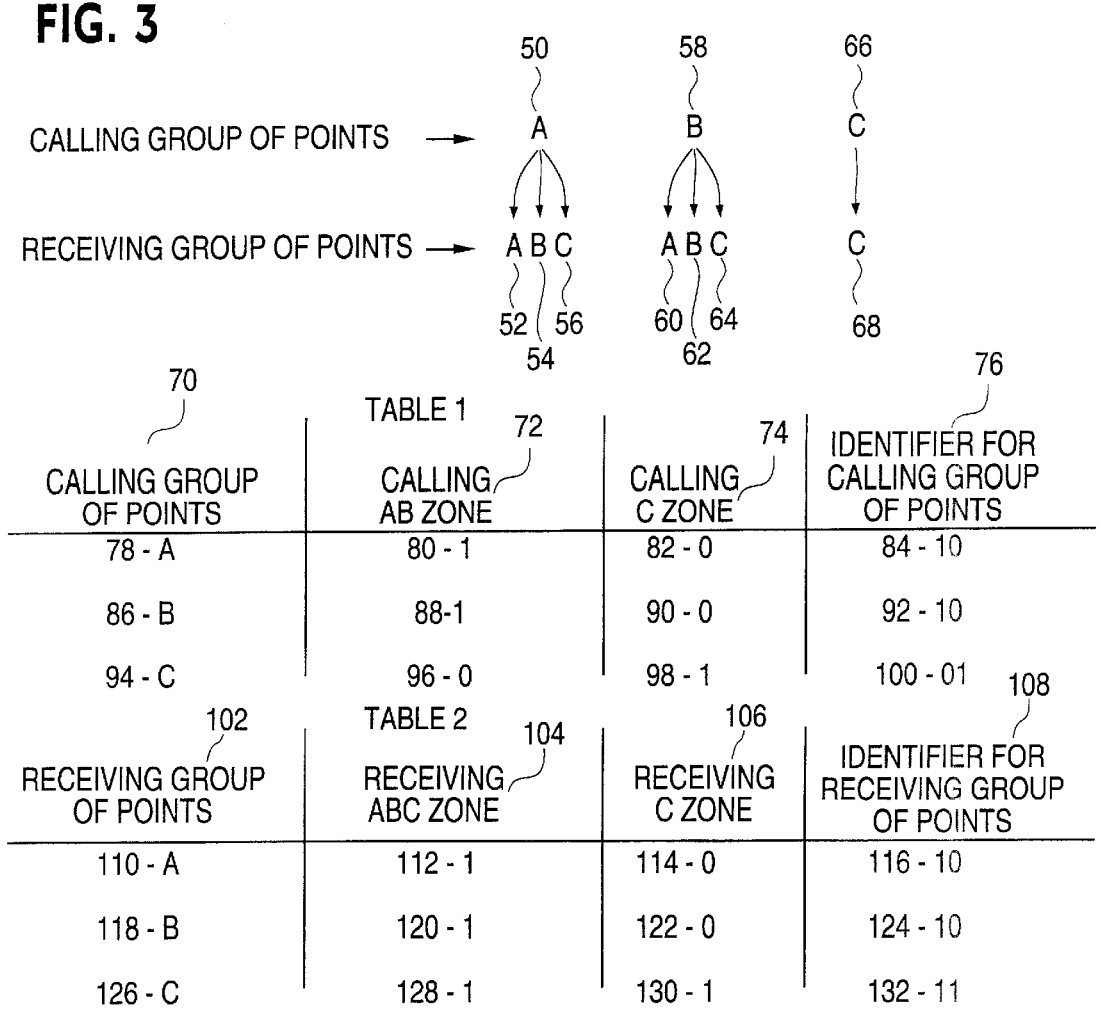

FIG. 4

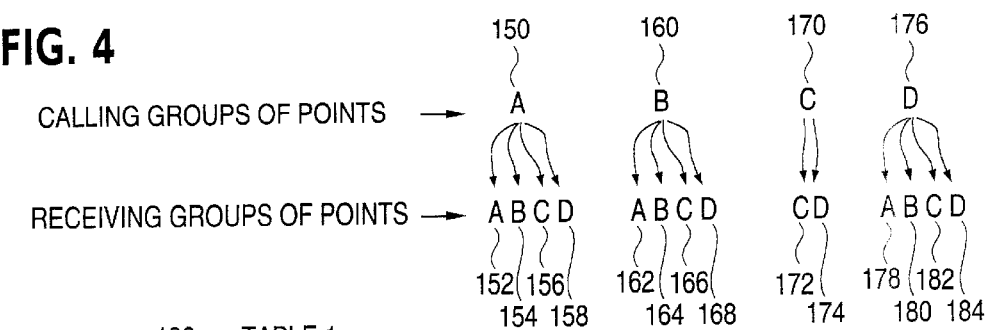

| 186<br>CALLING GROUP<br>OF POINTS | TABLE 1<br>188<br>CALLING<br>ABD ZONE | 190<br>CALLING<br>C ZONE | 200<br>IDENTIFIER FOR<br>CALLING GROUP<br>OF POINTS |
|---|---|---|---|
| 202 - A | 204 - 1 | 206 - 0 | 208 - 10 |
| 210 - B | 212 - 1 | 214 - 0 | 216 - 10 |
| 218 - C | 220 - 0 | 222 - 1 | 224 - 01 |
| 226 - D | 228 - 1 | 230 - 0 | 232 - 10 |

| 234<br>RECEIVING GROUP<br>OF POINTS | TABLE 2<br>236<br>RECEIVING<br>ABCD ZONE | 238<br>RECEIVING<br>CD ZONE | 240<br>IDENTIFIER FOR<br>RECEIVING GROUP<br>OF POINTS |
|---|---|---|---|
| 242 - A | 244 - 1 | 246 - 0 | 248 - 10 |
| 250 - B | 252 - 1 | 254 - 0 | 256 - 10 |
| 258 - C | 260 - 1 | 262 - 1 | 264 - 11 |
| 266 - D | 268 - 1 | 270 - 1 | 272 - 11 |

273 - IDENTIFIER FOR GROUP OF POINTS A : 1010

274 - IDENTIFIER FOR GROUP OF POINTS B : 1010

275 - IDENTIFIER FOR GROUP OF POINTS C : 0111

276 - IDENTIFIER FOR GROUP OF POINTS D : 1011

FIG. 5

| | | | |
|---|---|---|---|
| CALLING GROUP OF POINTS | A (278) | B (282) | C (285) |
| RECEIVING GROUP OF POINTS | A D F (279, 280, 281) | B E (283, 284) | C F (286, 287) |

HORIZONTAL CONNECTION

| | | | |
|---|---|---|---|
| CALLING GROUP OF POINTS | A (288) | C (292) | B (295) |
| RECEIVING GROUP OF POINTS | A D F (289, 290, 291) | C F (293, 294) | B E (296, 297) |

VERTICAL CONNECTION

| | | | |
|---|---|---|---|
| CALLING GROUP OF POINTS | A (298) | C (302) | B (305) |
| RECEIVING GROUP OF POINTS | F A D (299, 300, 301) | F C (303, 304) | B E (306, 307) |

SYSTEM FOR ASSIGNING DIGITAL IDENTIFIERS TO TELEPHONE NUMBERS AND IP NUMBERS

BACKGROUND OF THE INVENTION

1. Field of the Invention

The present invention is directed to a system designed to retrieve and process data such as telephone numbers, IP numbers, or cable numbers and, more particularly, to assigning common identifiers having some relationship information to the data and dynamically generate, store, and update therefrom calling rules.

2. Description of the Related Art

With the passage of the Telecommunications Act ("the Act") of 1996, the United States telecommunications industry is in a state of radical change. Among other things, the Act requires that Incumbent Local Exchange Carriers ("ILEC"), regulated entities that own and administer existing access networks, provide to any requesting telecommunications carrier (i.e., Competing Local Exchange Carriers ("CLEC")) nondiscriminatory access to network elements to provide telecommunications service. Further, ILECs have a duty to provide to CLECs interconnection with their network for the transmission and routing of telephone exchange service and exchange access. The interconnection contemplated by the Act provides nondiscriminatory access or interconnection to such services or information as necessary to allow the requesting CLEC to implement local dialing parity, including nondiscriminatory access to telephone numbers, operator service, directory assistance, and directory listing, with no unreasonable dialing delays.

The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc. However, often the local calling areas provided by ILEC are difficult to maintain in a billing system.

The fact that the local calling area is public still does not make the information usable to CLECs for a number of reasons. First, the information is complex, consisting of hundreds or thousands of prefix phone digits to map out the local calling area for each major market. The analysis needed to gather and load such information into a billing system is costly for CLECs, which usually are under financial pressure from investors seeking to see marketing strategies implemented quickly and cheaply.

Second, the configuration of the local calling area can change on a daily basis. It is even more difficult for CLECs to track changes in a local calling area configuration on an ongoing basis than it is to set up the configuration once. For example, if a CLEC has a marketing plan that offers customers a discount from the ILEC's rate for a local call, then the CLEC's billing system must not only detect every local call using the same definition of local calling area as the ILEC, but must maintain the CLEC's billing system so that it is updated every time the local calling area changes. Without proper maintenance the customer is not getting the plan that the CLEC is selling. Even a single new telephone prefix in an ILEC local calling area can render the CLEC out of synch with the ILEC.

Furthermore, the local zone does not have a geometrical shape and is not defined by mere distance but it is a predefined geographical shape. Thus, currently, some competitors rate local calling methods by distance which results in including more people in the zone that are outside the geographical local zone thereby causing CLECs to lose money.

SUMMARY OF THE INVENTION

It is an object of the present invention to provide for an apparatus and method including a group of points mapping unit dynamically mapping one or more points to one or more groups of points; a zone creator unit dynamically identifying the one or more groups of points having same calling areas and dynamically generating therefrom one or more local zones; and an assignment unit dynamically assigning an identifier to each group of points in each zone.

It is further an object of the present invention to provide for an apparatus and method including a group of points mapping unit dynamically mapping and updating one or more points to one or more groups of points; a zone creator unit dynamically identifying and updating the one or more groups of points having same calling areas and dynamically generating therefrom one or more local zones; and an assignment unit dynamically assigning and updating an identifier to each group of points in each zone.

It is further an object of the present invention to provide for a computer readable storage medium controlling a computer and including a process of mapping, dynamically, one or more Points to one or more groups of Points; identifying, dynamically, the one or more groups of Points having same calling areas and dynamically generating therefrom one or more local zones; assigning, dynamically, an identifier to each group of Points in each zone; and generating, dynamically, calling rules using the identifier assigned to each group of Points in each zone.

The above objects can be attained by a system that dynamically retrieves, processes, and generates local calling rules for billing purposes. The system of the present invention includes a Local Zone Configuration Tool including an Interface Module and a Business Logic Module. The Interface Module retrieves in real time, dynamically, from a file tariff database a group of telephone numbers, IP numbers or cable numbers (i.e., Points). The Business Logic Module includes a Local Zone Creator Module and a Rule Generator. The Local Zone creator Module includes a Group of Points Mapping unit, a Zone Creator unit, and an Assignment of Identifier unit.

The Group of Points unit dynamically maps the Points to one or more groups of Points. The Zone Creator unit dynamically identifies the group of Points that have the same calling areas and dynamically generates therefrom one or more local zones. The Assignment of Identifier unit dynamically assigns an identifier to each group of Points in each zone. The Rule Generator dynamically generates calling rules using the identifier to each group of Points in each zone and counts the number of identifiers assigned to each group of Points. The Business Logic Module further stores and updates the groups of Points, the local zones, the identifier to each group of Points in each zone, and the calling rules.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a diagram illustrating identifying local zones and assigning identifiers, in accordance with the present invention.

FIG. 4 is a diagram illustrating updating the local zones and the assignment of identifiers presented in FIG. 3.

FIG. 5 is a diagram illustrating an ordering process.

DESCRIPTION OF THE PREFERRED EMBODIMENTS

Companies that are in the telecommunications, cable, Internet service providers, utility, and similar industries assign numbers to their customers that identify them on their network. Some examples of these numbers are telephone numbers and IP addresses. Such numbers are referred to as Points as they are points on the network. The present invention assigns a digital identifier to a Point. The digital identifier is tied to the location, such as geographical location, of the customer in such a way that all the Points that behave the same way from the network's perspective have the same digital identifier.

Figure 1:
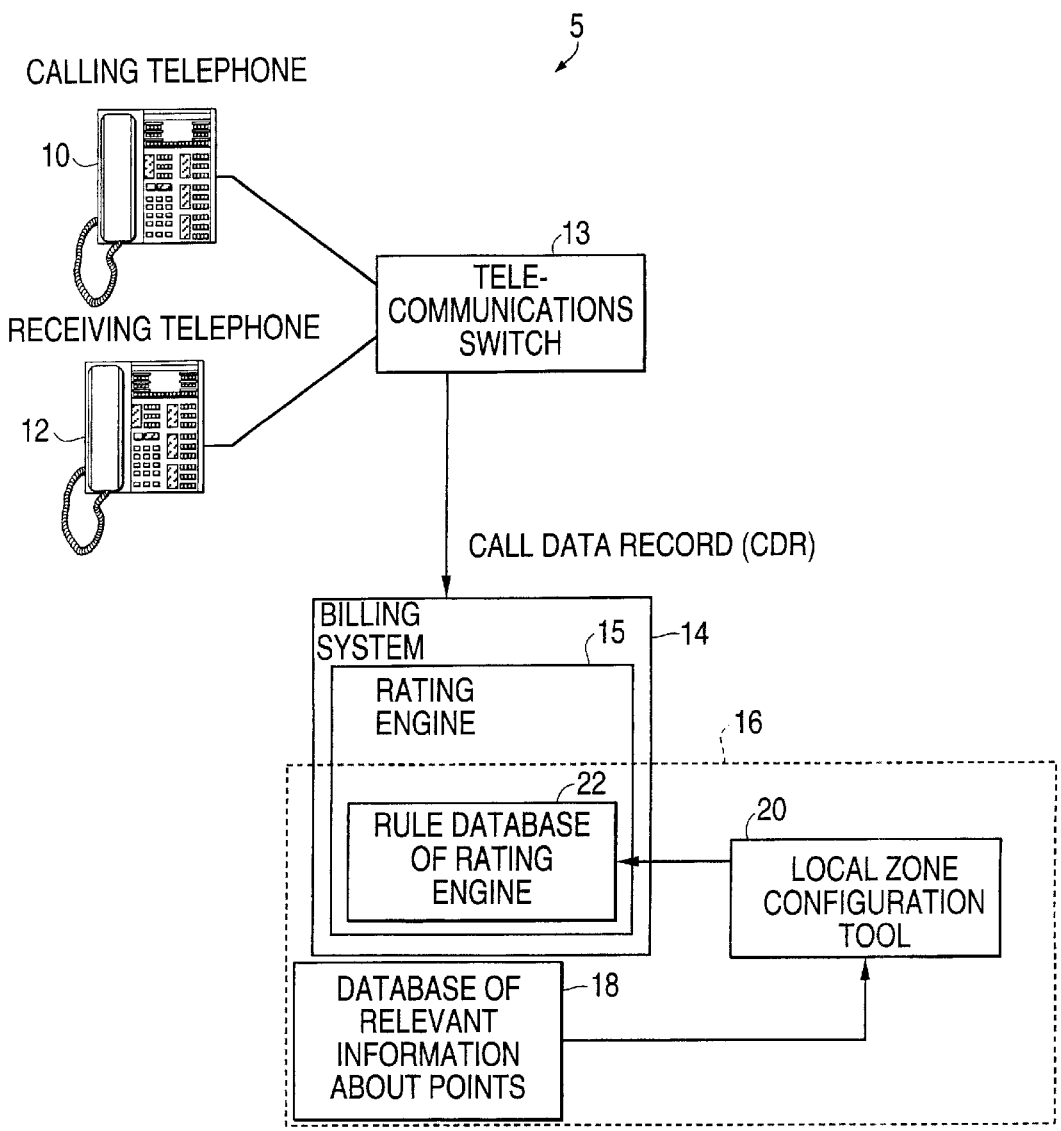
FIG. 1 is a diagram of a system architecture in accordance with the present invention.

FIG. 1 is a diagram of a system 5 architecture in accordance with the present invention. A calling telephone 10 and a receiving telephone 12 can access a telecommunications switch 13. Though there is shown one telecommunications switch 13, there may be more than one. The telecommunications switch 13 outputs a Call Data Record ("CDR"), which is the record that contains the information about the call such as the calling telephone number, the receiving telephone number, date and time of the call for the particular call being made. As shown in FIG. 1, a Billing System 14 includes a Rating Engine 15 and a Rule Database of Rating Engine 22, both to be later discussed. The Billing System 14 and the Rating Engine 15 are partially included in a Dynamic Local Zone Configuration System 16, to be later discussed. The Billing System 14, which includes customer account information, product catalogue, taxing rule database, etc., receives the CDR. The Rating Engine 15 is a software module within the Billing System 14. The Rating Engine 15 takes the CDR data from the Billing System 14 and rates the call being made using tables including customer information, calling plans, etc.

During billing, in order to determine the type of network relationship between calling telephone 10 and receiving telephone 12, that is, whether the call made by the calling telephone 10 to the receiving telephone 12 was a local call, a free call, or a call for a particular price, the CLEC accesses the Dynamic Local Zone Configuration System 16 which identifies and provides up-to-date calling area information. Specifically, the Dynamic Local Zone Configuration System 16 identifies and provides up-to-date calling area information in real time, in an automated manner and without human intervention. The calling telephone 10 and the receiving telephone 12 may have other types of network relationship such as forwarding calls, a special ring when called, etc. The Dynamic Local Zone Configuration System 16 includes a Local Zone Configuration Tool 20.

The Local Zone Configuration Tool 20 is a computer, such as a microprocessor, that dynamically gathers telephone numbers, for instance, from a Database of Relevant Information about Points 18, a data structure containing telephone number information that is typically organized by state, and maps the telephone numbers into groups. Generally, CLECs interested in obtaining local calling area information for each telephone number have a set of states in which they have operations and for which they would like to collect information. Rather than processing each telephone number to then determine the areas to which each telephone number may make local calls, the Local Zone Configuration Tool 20 processes the telephone numbers in groups. That is, if a telephone number, P1, and a telephone number, P2, can make local calls to each other for a given rate, both P1 and P2 are mapped into the same group.

The Local Zone Configuration Tool 20 then generates local zones for the groups having identical local calling areas. In an exemplary embodiment, the local zones may be ordered as calling zones and receiving zones. The Local Zone Configuration Tool 20 assigns identifiers to each group of Points in each calling zone and each receiving zone. The identifiers are then processed and translated into local calling rules that are understandable to current billing systems. Therefore, rather than generating calling rules for each telephone number or for each NPA-NXX, to be later discussed, the Local Zone Configuration Tool 20 generates calling rules using the identifier assigned to each group of Points. Then, the local calling rules are sent to a Rule Database of Rating Engine 22. The Rule Database of Rating Engine 22 provides information to the Rating Engine 15 in the Billing System 14 concerning the areas that are local and the areas that belong to a particular calling rate. Furthermore, once the calling rules are established, the Dynamic Local Zone Configuration System 16 dynamically updates the tables containing the calling rules.

Figure 2:
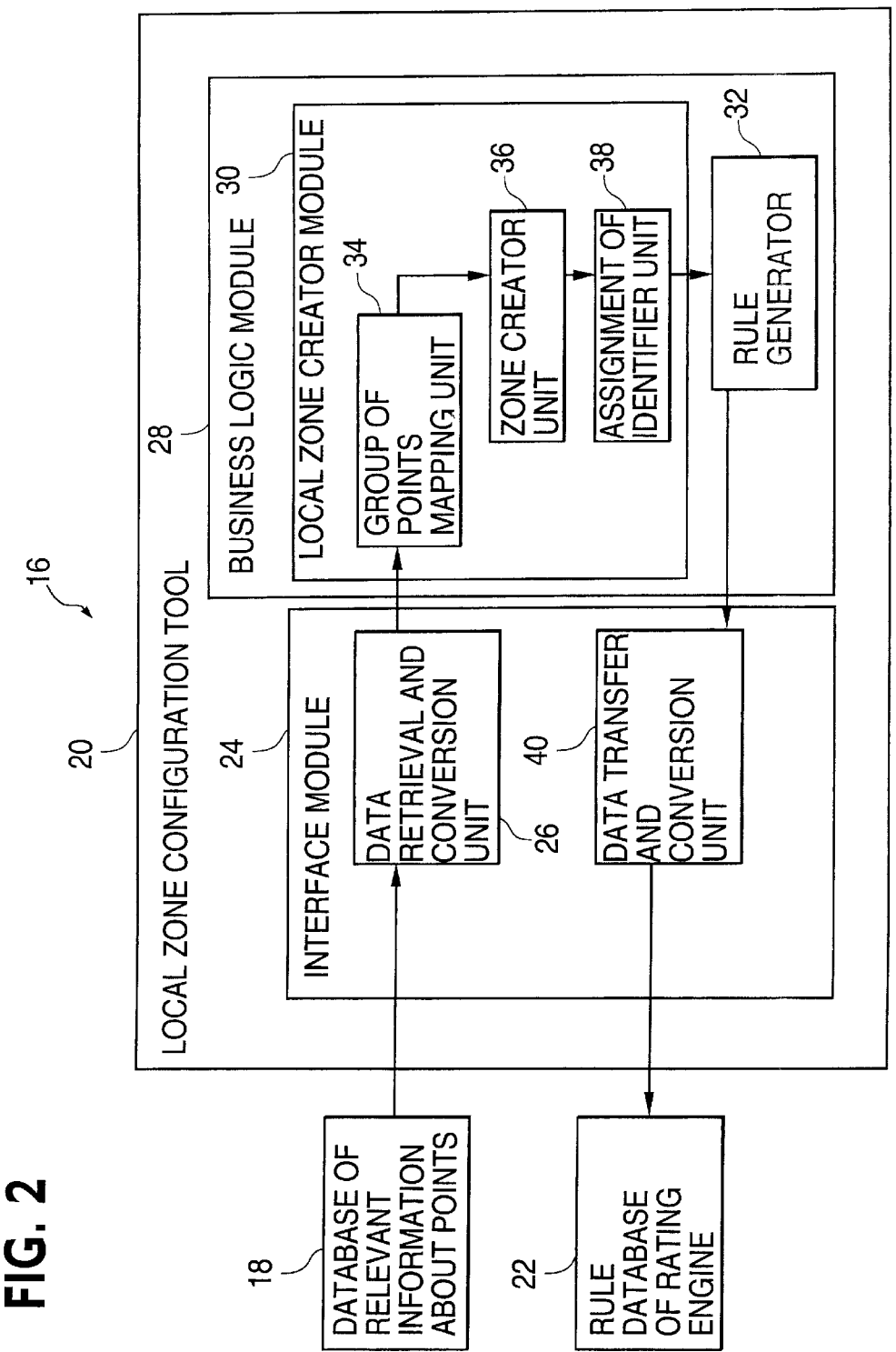
FIG. 2 is a diagram of a dynamic local zone configuration system, in accordance with the present invention.

FIG. 2 is a diagram of the Dynamic Local Zone Configuration System 16, in accordance with the present invention. The Database of Relevant Information about Points 18 ("Database 18") is provided by a database and includes relevant information between Points in a network such as file tariffs that define the Points that originate and terminate in the same Local Access and Transport Area "IntraLATA" and rates for those telephone numbers that originate and terminate outside the Local Access and Transport Area. The relevant information between Points in a network may also include free calling area, pricing between Points, quality of service connection, acts between Points, where acts are forwarding calls, having special ring when called, and/or being on the same billing statement. Points are defined as telephone numbers, cable numbers, and/or Internet Protocol ("IP") numbers, also known as, IP addresses. A local calling area is not necessarily defined by geographical boundaries but may be a predetermined domain. The local calling area may be defined as the area where a Point may make a local call to another Point. IntraLATA calls are routed based on the directory number, which is of the format NPA-NXX-XXXX (Area code-exchange code-last four digit numbers). The NPA-NXX (Area code-exchange code) prefix is used to route the call to the serving, local switch, or Central Office ("CO"). Furthermore, besides retrieving Points having NPANXX or NPA-NXX-XXXX format, Database 18 may also retrieve Points having IP version 4nnn.nnn.nnn.nnn where $0 \leq nnn \leq 255$ format, IP version 6nnn.nnn.nnn.nnn.nnn.nnn format, or IP version 4/6 with port number (for QoS, Quality of Service) format.

Database 18 may be obtained by scanning telephone books, by looking at tariff filings by the ILEC or by viewing other publications that define local calling areas. Further, Database 18 may be generated by accessing the relevant information from CCMI, the Center for Communications Management Information, an online provider of telecommunication information. CCMI's databases include area code maps, LATA maps, newsletters, and directories provide telecom information. The CCMI may be set up in a way that it provides the relevant information about each Point, for instance, in an HTML file format.

Once the Database 18 is generated, an Interface Module 24 in the Local Zone Configuration Tool 20 dynamically surveys the Database 18 and dynamically retrieves the relevant information in an XML file format, for instance, via a Data Retrieval and Conversion unit 26. For instance, the Local Zone Configuration Tool 20 functions as a web robot by dynamically accessing the relevant information in the CCMI site and retrieving the information via the Data Retrieval and Conversion unit 26. The Data Retrieval and Conversion unit 26 may be a pluggable module which may be then connected to the Database 18, the CCMI, or to any other type of database.

The Data Retrieval and Conversion unit 26 dynamically retrieves the relevant information about each Point, processes the relevant information, and converts the information into an XML data structure, for instance, making the data available to the Local Zone Configuration Tool 20 for further processing. The Data Retrieval and Conversion unit 26 transfers the HTML file containing the relevant information to a Business Logic Module 28. The Business Logic module 28 includes a Local Zone Creator Module 30 and a Rule Generator 32.

The Business Logic Module 28 receives and processes the relevant information about each Point and thereby generates and outputs calling rules that define communication services between Points. The relevant information may include local calling area, free calling area, pricing between Points, quality of service connection, acts between Points, where acts are forwarding calls, having special ring when called, and/or being on the same billing statement. For exemplary purposes, the Business Logic Module 28 in the present embodiment processes local calling area information about each Point and thereby generates and outputs calling rules that define communication services that originate and terminate in the same local calling area.

Specifically, the Local Zone Creator Module 30 includes a Group of Points Mapping unit 34, a Zone creator unit 36, and an Assignment of Identifier unit 38. The Group of Points Mapping unit 34 receives the HTML file from the Data Retrieval and Conversion unit 26 and processes the relevant information. The Group of Point Mapping unit 34 maps each Point to a group of Points. For instance, P1, P2, P3, P4, and P5 each is defined as a Point (i.e., telephone number). If P1 and P3 are both within the same local calling area, then both Points are mapped to the same group of Points, for instance, group of Points A. If P2 and P5 are both within the same local calling area, then both Points are mapped to the same group of Points, for instance, group of Points B. If P4 is within its own local calling area, P4 is mapped to its own group of Points, for instance, group of Points C. Thus, Group of Points Mapping unit 34 generates and transfers, in this instance, three groups of Points A, B, and C to the Zone Creator unit 36. In the alternative, each group of Points may be referred to as greater NPA-NXX groups or Originating Zones formed by NPA-NXXs (Points) that have an identical calling area.

The Zone Creator unit 36 dynamically processes each group of Points as a calling group of Points and as a receiving group of Points because although one group of Points may be able to call another group of Points, the opposite may not be necessarily true. The Zone creator unit 36 then dynamically determines which group or groups of Points have the same local calling area. Those group or groups of Points having the same local calling area are identified as a local zone. Specifically, the Zone Creator unit 36 determines which calling groups of Points can call the same receiving group of Points. If two or more calling group of Points can call the same receiving group of Points, then a calling zone is defined. If a calling group of Points can make local calls to receiving group of Points different from other calling group of Points, then that particular calling group of Points is identified as having its own calling zone. The receiving groups of Points of the two or more calling groups of Points having the same receiving groups of Points are then identified as a receiving zone. If one or more receiving groups of Points of a calling group of Points are different from one or more receiving groups of Points of another calling group of Points, then the one or more receiving group of Points of the calling group of Points is identified as having its own receiving zone. The Zone Creator unit 30 then sends the local zones (i.e., the calling zones and receiving zones) identified to the Assignment of Identifier unit 38.

The Assignment of Identifier unit 38 dynamically assigns a digital identifier to each calling group of Points in each calling zone, dynamically assigns a digital identifier to each receiving group of Points in each receiving zone, and dynamically assigns a digital identifier to each receiving group of Points in each zone. The Rule Generator 32 generates business or calling rules necessary to facilitate communication and messaging between the zones.

The Rule Generator 32 generates local calling rules by scanning or using the identifiers assigned to each group of Points. Specifically, the Rule Generator 32 generates the rules by concatenating the identifiers assigned to the calling group of Points in each calling zone and the identifiers assigned to the receiving group of Points in each receiving zone and generates therefrom a combined concatenated identifier for each group of Points. The Rule Generator 32 then processes the combined identifiers using the digital identifier itself that implicitly contains the rules (i.e., Point, P1, as a calling Point, may make a local call to Point P2, as a receiving Point; but P2, as a calling Point, may not make a local call to P1, as a receiving Point).

The Rule Generator 32 transfers the calling rules in XML format, for example, to a Data Transfer and Conversion unit 40 included in the Interface Module 24. The Data Transfer and Conversion unit 40 in turn converts the rules generated by the Rule Generator 32 into SQL commands, for instance, that transfer the data to the Rule Database of Rating Engine 22. An alternative embodiment would provide for the Data Transfer and Conversion unit 40 to convert the rules generated by the Rule Generator 32 into Application Programming Interface ("API") calls used by billing systems that allow transfer of the data to the Rule Database of Rating Engine 22. The Rule Database of Rating Engine 22 allows multiple telecommunication carriers to access information about telecommunication services that originate and terminate in the same calling area and rates for those services that originate and terminate in different calling areas based on the rules generated. The Local Zone Configuration Tool 20 further includes a reporting tool (not shown) that processes and determines an order in which to display the calling group of Points and associated receiving group of Points so they are easily understandable and verifiable. See FIG. 5, to be later described. Further, the reporting tool may also convert and transfer to the Rule Database of Rating Engine 22 the identifiers obtained for each Point in each calling group of Points in each of the calling zones, the identifiers obtained for each Point in each receiving group of Points in each of the receiving zones, or the combined concatenated identifier into human understandable identifiers, thereby allowing CLECs and/or users to easily understand and read the identifiers accorded to each Point.

System 16 also includes permanent or removable storage, such as magnetic and optical discs, RAM, ROM, etc. on which the process and data structures of the present invention can be stored and distributed. The processes can also be distributed via, for example, downloading over a network such as the Internet. Furthermore, the Local Zone Configuration Tool 20 may via the Interface Module 24 include, for instance, mechanisms to dynamically survey the information in Database 18 to determine if any changes have occurred within Database 18. For instance, the Local Zone Configuration Tool 20 may dynamically survey the current date and version of Database 18, and thereby trigger a system update, to be described in FIG. 6. In the alternative, the Local Zone Configuration Tool 20 may dynamically survey the relevant information from each Point in Database 18 to determine if the current date and/or version have changed and thereby trigger the system update. System 16 may also provide a mechanism to trigger a survey of Database 18 on demand.

Once the updates are retrieved and sent to the Group of Points Mapping Unit 34, the Group of Points Mapping Unit 34 would dynamically map one or more updated Points to one or more new or existing group of Points. For instance, assuming that groups of Points A, B, and C are existing group of Points and Points P6 and P7 are a new Points. If the Group of Points Mapping Unit 34 determines that P6 and P7 are both within the same local calling area but different from the local calling area of groups of Points A, B, and C, then Points P6 and P7 are mapped to the same group of Points, for instance, group of Points D. Thus, Group of Points Mapping unit 34 generates and transfers, in this instance, a new group of Points D to the Zone creator unit 36.

An updated Point may be a new Point added to the existing Points or may be a Point that needs to be removed from the present group of Points to a new or to another existing group of Points. The Zone creator unit 36 then dynamically maps each updated group of Points having same calling areas into one or more local zones. The Assignment of Identifier unit 38 would dynamically assign an identifier to each zone. The Rule Generator 32 would then dynamically generate updated calling rules using the identifier assigned to each zone.

For illustrative purposes, FIG. 3 is a diagram illustrating identifying local zones and assigning identifiers in accordance with the present invention. In general, FIG. 3 illustrates once each Point is mapped to a group of Points, the group of Points are ordered as calling groups of Points and receiving groups of Points. The receiving groups of Points that each calling group of Points may call is determined from Database 18. Local zones then are determined. As previously set forth, the local zones may be ordered as calling zones and receiving zones. Thus, identifiers are assigned to each calling group of Points in each calling zone and identifiers are assigned to each receiving group of Points in each receiving zone. The identifiers for the calling group of Points and receiving group of Points are concatenated to then generate an identifier for each group of Points.

Specifically, A, B, and C are groups of Points and each may include a single Point (e.g., NPA-NXX or NPA-NXX-XXXX format, cable numbers, or IP numbers in any IP version and/or service combination) or multiple Points. Each group of Points, A, B, and C is ordered as a calling group of Points and as a receiving group of Points. Calling group of Points A 50 may call any Point within the receiving groups of Points A 52, B 54, or C 56. Calling group of Points B 58 may call any Point within the receiving groups of Points A 60, B 62, or C 64. Calling group of Points C 66 may call any Point within the receiving group of Points C 68.

The system 16 then identifies the local zones as calling zones and receiving zones for each group of Points. In this instance, because calling group of Points A 50 and B 58 may call the same receiving group of Points A 52, 60, B 54, 62, and C 56, 64, a calling AB zone 72 is identified. However, because calling group of Points C 66 cannot call the same receiving group of Points as calling groups of Points A 50 and B 58, calling group of Points C 66 has its own individual calling C zone 74. Next, the receiving groups of Points of the two or more calling groups of Points having the same receiving groups of Points are then identified as a receiving zone. Thus, the receiving groups of Points A 52, 60, B 54, 62, and C 56, 64 of the calling groups of Points A 50 and B 58 are identified as a receiving ABC zone 104. Because the receiving group of Points C 68 of the calling group of Points C 66 is different from the receiving groups of Points of the other calling groups of Points A 50 and B 58, the receiving group of Points C 66 is identified as having its own receiving C zone 106.

Referring to Table 1 in FIG. 3, this table shows in tabular form calling group of Points 70, calling AB zone 72, calling C zone 74, and an identifier 76 accorded to each calling group of Points. Because calling group of Points A 78 is a member or a set of the calling AB zone 72, calling group of Points A 78 is associated with AB zone 72 and an identifier of "1" 80 is accorded to the calling group of Points A 78 in the AB zone 72. Because calling group of Points A 78 is not a member of the calling C zone 74, an identifier of "0" 82 is accorded to the calling group of Points A 78 in the calling C zone 74. The identifiers 80, 82 for the calling group of Points A 78 in each calling zone (i.e., calling AB zone 72 and calling C zone 74) are concatenated and, thus, the concatenated identifier 76 for the calling group of Points A 78 in the calling AB zone 72 and the calling C zone 74 is "10" 84.

Because calling group of Points B 86 is a member of the calling AB zone 72, calling group of Points B 86 is associated with the calling AB zone 72 and an identifier of "1" 88 is accorded to the calling group of Points B 86 in the calling AB zone 72. Because group of Points B 86 is not a member of the calling C zone 74, a digital number "0" 90 is accorded to the calling group of Points B 86 in the calling C zone 74. The identifiers 88, 90 for the calling group of Points B 86 in each calling zone (i.e., AB zone 72 and C zone 74) are concatenated and, thus, the concatenated identifier 76 for the calling group of Points B 86 in the calling AB zone 72 and the calling C zone 74 is "10" 92.

Turning to calling group of Points C 94, because calling group of Points C 94 is not a member of the calling AB zone 72, calling group of Points C 94 is not associated with the calling AB zone 72 and an identifier of "0" 96 is accorded. However, because calling group of Points C 94 is a member of the calling C zone 74, a digital number "1" 98 is accorded to the calling group of Points C 94 in the calling C zone 74. The identifiers 96, 98 for the calling group of Points C 94 in each calling zone (i.e., AB zone 72 and C zone 74) are concatenated and, thus, the concatenated identifier 76 for the calling group of Points C 94 in the calling AB zone 72 and the calling C zone 74 is "01" 100.

Referring to Table 2 in FIG. 3, this table shows in tabular form receiving group of Points 102, the receiving ABC zone 104, the receiving C zone 106, and the identifier 108 accorded to each receiving group of Points in the receiving ABC zone 104 and the receiving C zone 106. Because receiving group of Points A 110 is a member of the receiving ABC zone 104, receiving group of Points A 110 is associated with the receiving ABC zone 104 and an identifier of "1" 112 is accorded to the receiving group of Points A 110. However, because receiving group of Points A 110 is not a member of the receiving C zone 106, a digital number "0" 114 is accorded to the receiving group of Points A 110 in the receiving C zone 106. The identifiers 112, 114 for the receiving group of Points A 110 in each receiving zone (i.e., the receiving ABC zone 104 and receiving C zone 106) are concatenated and, thus, the concatenated identifier 108 for the receiving group of Points A 110 in the receiving ABC zone 104 and the receiving C zone 106 is "10" 116.

Because receiving group of Points B 118 is a member of the receiving ABC zone 104, receiving group of Points B 118 is associated with the receiving ABC zone 104 and an identifier of "1" 120 is accorded to the receiving group of Points B 118. However, because receiving group of Points B 118 is not a member of the receiving C zone 106, a digital number "0" 122 is accorded to the receiving group of Points B 118 in the receiving C zone 106. The identifiers 120, 122 for the receiving group of Points B 118 in each receiving zone (i.e., the receiving ABC zone 104 and the receiving C zone 106) are concatenated and, thus, the concatenated identifier 108 for the receiving group of Points B 118 in the receiving ABC zone 104 and the receiving C zone 106 is "10" 124.

Turning to receiving group of Points C 126, because the receiving group of Points C 126 is a member of the receiving ABC zone 104 (i.e., receiving groups of Points C 56, 64), receiving group of Points C 126 is associated with the receiving ABC zone 104 and an identifier of "1" 128 is accorded to the receiving group of Points C 126. Further, because the receiving group of Points C 126 is a member of the receiving C zone 106, a digital number "1" 130 is accorded to the receiving group of Points C 126 in the receiving C zone 106. The identifiers 128, 130 for the receiving group of Points C 126 in each receiving zone (i.e., the receiving ABC zone 104 and the receiving C zone 106) are concatenated and, thus, the concatenated identifier 108 for the receiving group of Points C 126 in the receiving ABC zone 104 and the receiving C zone 106 is "11" 132.

The identifiers obtained for each calling group of Points and for each receiving group of Points are subsequently concatenated. Thus, the combined identifier for the calling and receiving group of Points A 78, 110 is "1010" 134, the combined identifier for the calling and receiving group of Points B 86, 118 is "1010" 136, and the combined identifier for the calling and receiving group of Points C 94, 126 is "0111" 138. The Local Zone Creator Module 30 sends the combined identifiers for each group of Points to the Rule Generator 32, which in turn processes the combined identifiers to create the rules defining the local zones using conventional rule generation methods. For instance, a rule is created where the group of Points A ("1010") may call as a local call to the group of Points C ("0111"). However, the group of Points C cannot call the group of Points A as a local call. Each group of Points is associated with the other group of Points and thereby creates the rules indicating local calls that are later used by the database in the rating engine.

Thus, a person of ordinary skill in the art will appreciate that assigning identifiers to the group of Points and generating calling rules therefrom rather than assigning identifiers to each Point and generating calling rules therefrom significantly reduces processing time and increases processing speed. This arrangement makes the system effective and efficient. For example, the number of Points per group of Points and thus, per identifier, varies from one to several hundred, the average usually above 10 Points.

Assuming 10 Points per group of Points per identifier, the size of a table containing the identifiers for each group of Points is reduced by one order of magnitude, and the size of a table containing the calling rules is reduced by two orders of magnitude. Because the Rule Database of Rating Engine 22 needs to verify all rules, and since lookup of the rules is $O(x)$ (i.e., a standard mathematical expression for similar when $x \to \infty$) to $O(X^2)$ the rating engine will be 100 to 10,000 times faster. Thus, rather than having to generate calling rules for 10 Points, system 16 needs to generate a calling rule for only one group of Points. Furthermore, mapping Points to groups of Points, generating zones, and assigning identifiers to the groups of Points based on the zones make the generation of the local calling rules very simple because a member of zone AB, for instance, is able to call any Point that has the same identifier as its group of Points.

Furthermore, if a person moves from one call center to another and wishes to maintain the current telephone number, current telephone systems do not know how to rate the local calls for the ported number in the new call center. In contrast, the present system dynamically updates the call center without having to incur excessive expenditures or system enhancements and allows telephone systems to rate local calls for the ported numbers.

FIG. 4 illustrates a process for updating the local zones and the assignment of identifiers presented in FIG. 3. In general, FIG. 4 illustrates the flexibility and capabilities of system 16 to dynamically update a new group of Points and update the identifiers of the existing groups of Points and assign an identifier to the new group of Points.

For instance, system 16 retrieves an updated Point and this Point is mapped to a new group of Points D. A person of ordinary skill in the art will appreciate that, similarly to the groups of Points A, B, and C, the group of Points D may include a group of Points (i.e., more than one telephone number, cable number, or IP number).

Each group of Points, A, B, C, and D, is ordered as a calling group of Points and as a receiving group of Points. Calling group of Points A 150 may call any Point within the receiving groups of Points A 152, B 154, C 156, or D 158. Calling group of Points B 160 may call receiving group of Points A 162, B 164, C 166, or D 168. Calling group of Points C 170 may call receiving group of Points C 172 or D 174. Calling group of Points D 176 may call receiving group of Points A 178, B 180, C 182, or D 184.

The system 16 then identifies the calling zones and receiving zones for each calling group of Points A 150, B 160, C 170, and D 176. In this instance, because calling group of Points A 150, B 160, and D 176 may call the same receiving group of Points A 152, 162, 178, B 154, 164, 180, C 156, 166, 182, and D 158, 168, 184 the calling AB zone 72 is updated and a calling ABD zone 188 is identified. However, because calling group of Points C 170 cannot call the same receiving group of Points as calling groups of Points A 150, B 160, and D 176, calling group of Points C 170 has its own individual calling C zone 190. Next, the receiving groups of Points of the two or more calling groups of Points having the same receiving groups of Points are then identified as a receiving zone. Thus, the receiving groups of Points A 152, 162, 178, B 154, 164, 180, C 156, 166, 182, and D 158, 168, 184 of the calling groups of Points A 150, B 160, and D 176 are identified as a receiving ABCD zone 236. Because the receiving groups of Points C 172 and D 174 of the calling group of Points C 170 are different from the receiving groups of Points of the other calling groups of Points A 150, B 160, and D 176, the receiving groups of Points C 172 and D 174 are identified as having their own receiving C zone 238.

Referring to Table 1 in FIG. 4, this table shows in tabular form calling group of Points 186, the calling ABD zone 188, the calling C zone 190, and an identifier 200 accorded to each receiving group of Points in the calling ABD zone 188 and the calling C zone 190. Because the calling group of Points A 202 is a member of the calling ABD zone 188, calling group of Points A 202 is associated with calling ABD zone 188 and an identifier of "1" 204 is accorded to the calling group of Points A 202 in the calling ABD zone 188. Because calling group of Points A 202 is not a member of the calling C zone 190, an identifier "0" 206 is accorded to the calling group of Points A 202 in the calling C zone 190. The identifiers 204, 206 for the calling group of Points A 202 in each calling zone (i.e., calling ABD zone 188 and calling C zone 190) are concatenated and, thus, the concatenated identifier 200 for the calling group of Points A 202 in the calling ABD zone 188 and the calling C zone 190 is "10" 208.

Because calling group of Points B 210 is a member of the calling ABD zone 188, calling group of Points B 210 is associated with calling ABD zone 188 and an identifier of "1" 212 is accorded to the calling group of Points B 210 in the calling ABD zone 188. Because calling group of Points B 210 is not a member of the calling C zone 190, an identifier "0" 214 is accorded to the calling group of Points B 210 in the calling C zone 190. The identifiers 212, 214 for the calling group of Points B 210 in each calling zone (i.e., calling ABD zone 188 and calling C zone 190) are concatenated and, thus, the concatenated identifier 200 for the calling group of Points B 210 in the calling ABD zone 188 and the calling C zone 190 is "10" 216.

Turning to the calling group of Points C 218, because the calling group of Points C 218 is not a member of the calling ABD zone 188, the calling group of Points C 218 is not associated with the calling ABD zone 188 and an identifier of "0" 220 is accorded to the calling group of Points C 218 in the calling ABD zone 188. However, because the calling group of Points C 218 is associated with the calling C zone 190, an identifier "1" 222 is accorded to the calling group of Points C 218 in the calling C zone 190. The identifiers 220, 222 for the calling group of Points C 218 in each calling zone (i.e., calling ABD zone 188 and calling C zone 190) are concatenated and, thus, the concatenated identifier 200 for the calling group of Points C 218 in the calling ABD zone 188 and the calling C zone 190 is "01" 224.

Turning to calling group of Points D 226, because calling group of Points D 226 is a member of the calling ABD zone 188, calling group of Points D 226 is associated with the calling ABD zone 188 and an identifier of "1" 228 is accorded to the calling group of Points D 226 in the calling ABD zone 188. Because calling group of Points D 226 is not a member of the calling C zone 190, an identifier "0" 230 is accorded to the calling group of Points D 226 in the calling C zone 190. The identifiers 228, 230 for the calling group of Points D 226 in each calling zone (i.e., calling ABD zone 188 and calling C zone 190) are concatenated and, thus, the concatenated identifier 200 for the calling group of Points D 226 in the calling ABD zone 188 and the calling C zone 190 is "10" 232.

Referring to Table 2 in FIG. 4, this table shows in tabular form receiving group of Points 234, the receiving ABCD zone 236, the receiving CD zone 238, and the identifier 240 accorded to each receiving group of Points in the receiving ABCD zone 236 and the receiving CD zone 238. Because receiving group of Points A 242 is a member of the receiving ABCD zone 236, receiving group of Points A 242 is associated with receiving ABCD zone 236 and an identifier of "1" 244 is accorded to the receiving group of Points A 242 in the receiving ABCD zone 236. However, because the receiving group of Points A 242 is not a member of the receiving CD zone 238, an identifier "0" 246 is accorded to the receiving group of Points A 242 in the receiving CD zone 238. The identifiers 244, 246 for the receiving group of Points A 242 in each calling zone (i.e., receiving ABCD zone 236 and receiving CD zone 238) are concatenated and, thus, the concatenated identifier 240 for the receiving group of Points A 242 in the receiving ABCD zone 236 and the receiving CD zone 238 is "10" 248.

Because the receiving group of Points B 250 is a member of the receiving ABCD zone 236, receiving group of Points B 250 is associated with the receiving ABCD zone 236 and an identifier of "1" 252 is accorded to the receiving group of Points B 250 in the receiving ABCD zone 236. However, because the receiving group of Points B 250 is not a member of the receiving CD zone 238, an identifier "0" 254 is accorded to the receiving group of Points B 250 in the receiving CD zone 238. The identifiers 252, 254 for the receiving group of Points B 250 in each calling zone (i.e., receiving ABCD zone 236 and receiving CD zone 238) are concatenated and, thus, the concatenated identifier 240 for the receiving group of Points B 250 in the receiving ABCD zone 236 and the receiving CD zone 238 is "10" 256.

Turning to the receiving group of Points C 258, because the receiving group of Points C 258 is a member of the receiving ABCD zone 236, receiving group of Points C 258 is associated with receiving ABCD zone 236 and an identifier of "1" 260 is accorded to the receiving group of Points C 258 in the receiving ABCD zone 236. Further, because the receiving group of Points C 258 is a member of the receiving C zone 238, an identifier "1" 262 is accorded to the receiving group of Points C 258 in the receiving CD zone 238. The identifiers 260, 262 for the receiving group of Points C 258 in each calling zone (i.e., receiving ABCD zone 236 and receiving CD zone 238) are concatenated and, thus, the concatenated identifier 240 for the receiving group of Points C 258 in the receiving ABCD zone 236 and the receiving CD zone 238 is "11" 264.

Turning to the receiving group of Points D 266, because the receiving group of Points D 266 is a member of the receiving ABCD zone 236, the receiving group of Points D 266 is associated with the receiving ABCD zone 236 and an identifier of "1" 268 is accorded to the receiving group of Points D 266 in the receiving ABCD zone 236. Further, because the receiving group of Points D 266 is a member of the receiving C zone 238, an identifier "1" 270 is accorded to the receiving group of Points D 266 in the receiving CD zone 238. The identifiers 268, 270 for the receiving group of Points D 266 in each calling zone (i.e., receiving ABCD zone 236 and receiving CD zone 238) are concatenated and, thus, the concatenated identifier 240 for the receiving group of Points D 266 in the receiving ABCD zone 236 and the receiving CD zone 238 is "11" 272.

The identifiers obtained for each calling group of Points and for each receiving group of Points are subsequently concatenated. Thus, the combined identifier for the calling and receiving group of Points A 202, 242 is "1010" 273. The combined identifier for the calling and receiving group of Points B 210, 250 is "1010" 274. The combined identifier for the calling and receiving group of Points C 218, 258 is "0111" 275. The combined identifier for the calling and receiving group of Points D 226, 266 is "1011" 276. Subsequently, the Local Zone Creator Module 30 sends the combined identifiers for each group of Points to the Rule Generator 32, which in turn processes the combined identifiers to create the rules defining the local zones.

FIG. 5 illustrates an ordering process performed by system 16 to display in logical order (i.e., ordered connection trees) the calling groups of Points and the receiving groups of Points. The ordered connection trees provide users with an intuitive visual map of the calling groups of Points, receiving groups of Points, zones, and associated calling rules. Such ordered connection trees can help to verify the integrity of the local calling areas.

For illustrative purposes, assuming that the calling group of Points A 278 may make phone calls to the receiving groups of Points A 279, D 280, and F 281. The calling group of Points B 282 may make phone calls to the receiving groups of Points B 283 and E 284. The calling group of Points C 285 may make calls to the receiving groups of Points C 286 and F 287. The calling groups of Points are originally ordered as A 278, B 282, and C 285.

System 16 implements a horizontal connection ordering. The horizontal connection is an iterative process to order those calling groups of Points that include at least one common receiving group of Points. For instance, calling group of Points A 278 and calling group of Points C 285 each include receiving group of Points F 281 and F 287, respectively. The horizontal connection ordering implemented by system 16 orders the calling group of Points by exchanging the position of the calling group of Points so as to place the calling groups of Points that include at least one common receiving group of Points adjacent to each other. In this case, the order of calling groups of Points after the horizontal connection is applied is calling groups of Points A 288, C 292, and B 295.

A vertical connection ordering uses an iterative process to arrange the receiving groups of Points for each calling group of Points in order that starts with the receiving group of Point(s) that are common among/between the calling groups of Points. In this illustration, receiving group of Points F 291 and receiving group of Points F 294 are each included in the calling group of Points A 288 and C 292, respectively. Thus, receiving group of Points F 291 is ordered first among the receiving groups of Points A 289, D 290, and F 291 included in calling group of Points A 288. Because receiving groups of Points A 289 and D 290 are not in other calling groups of Points, the vertical connection ordering does not disturb their position relative to each other and shifts them next to the receiving group of Points F 291.

Similarly, receiving group of Points F 294 associated with the calling group of Points C 292 exchanges position with the receiving group of Points C 293. Because the receiving groups of Points B 296 and E 297 associated with the calling group of Points B 295 are not included in other calling groups of Points, the positions of the receiving groups of Points B 296 and E 297 are not disturbed. After the vertical connection ordering is performed, calling group of Points A 298 includes receiving group of Points F 299, A 300, and D 301 in that order. Calling group of Points C 302 includes receiving group of Points F 303 and C 304 in that order. Calling group of Points B 305 includes receiving group of Points B 306 and E 307 in that order. Subsequently, system 16 would output the ordered connection trees to the Rule Database of Rating Engine 22.

Figure 6:
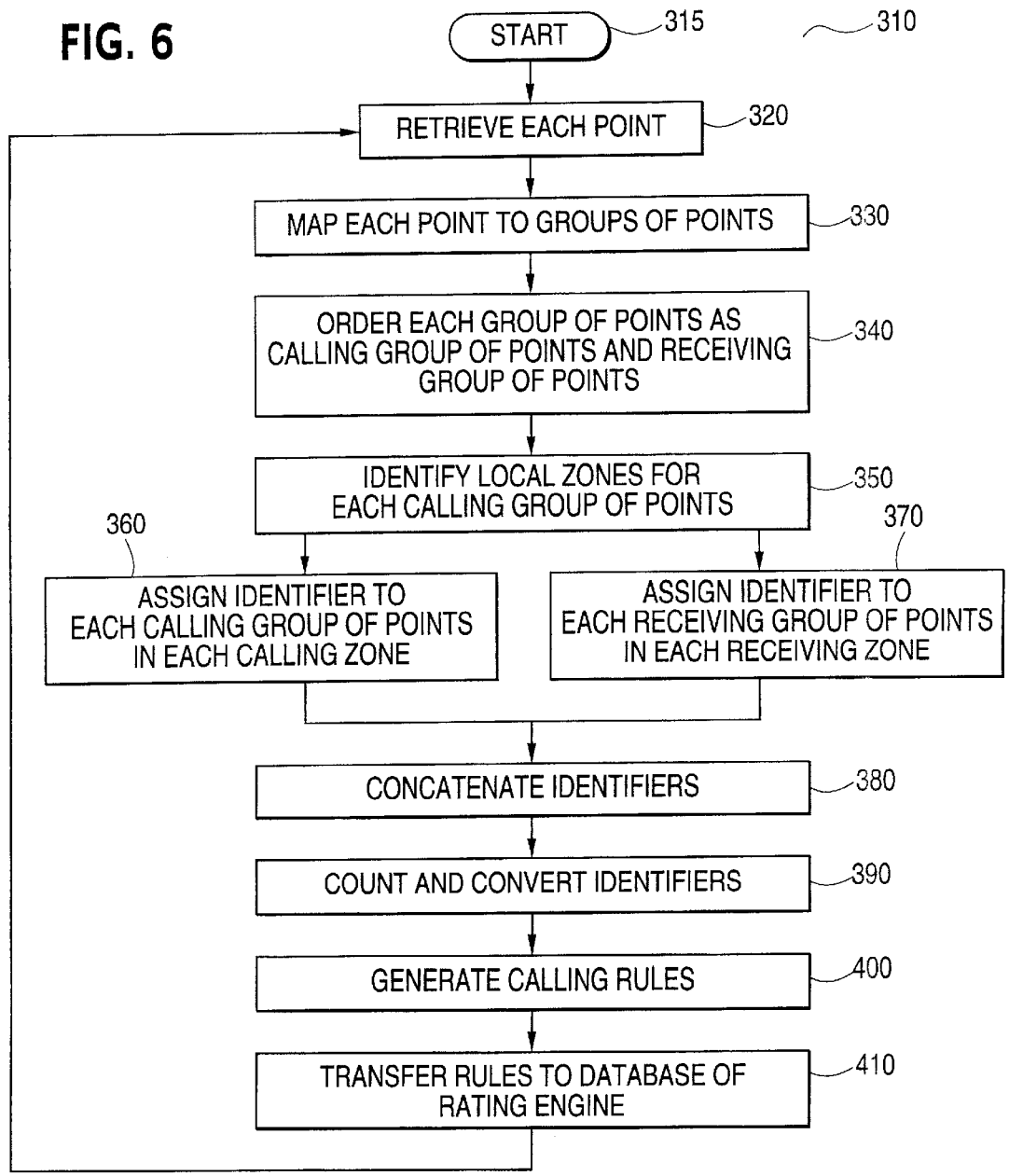
FIG. 6 is a diagram illustrating a process identifying local zones and assigning identifiers, in accordance with the present invention.

FIG. 6 is a diagram illustrating a process 310 identifying local zones and assigning identifiers, in accordance with the present invention. Process 310 starts 315 by clearing memories, setting initial flag conditions, etc., as is well known in the art. Process 310 then proceeds to retrieve 320 each Point (i.e., telephone numbers, IP numbers, and/or cable numbers) from Database 18. Each Point is then mapped 330 to groups of Points. In one embodiment, process 310 groups together all Points having the same NPA-NXX numbers into groups of Points. In an alternative embodiment, NPA-NXX-XXXX numbers, IP numbers, or cable numbers may be mapped to groups of Points. Process 310 then orders 340 each group of Points as calling group of Points and receiving group of Points and tabulates each group of Points as calling group of Points and receiving group of Points. (See calling group of Points 70 and receiving group of Points 102 in FIG. 2).

Next, process 310 identifies 350 each zone as a calling zone and as a receiving zone. (See calling AB zone 72, calling zone 74, receiving ABC zone 104, and receiving C zone 106 in FIG. 3) Specifically, as previously set forth, if two or more calling group of Points can call the same receiving group of Points, then a calling zone is defined. If a calling group of Points can make local calls to receiving group of Points different from other calling group of Points, then that particular calling group of Points is identified as having its own calling zone. The receiving groups of Points of the two or more calling groups of Points having the same receiving groups of Points are then identified as a receiving zone. If one or more receiving groups of Points of a calling group of Points are different from one or more receiving groups of Points of another calling group of Points, then the one or more receiving group of Points of the calling group of Points is identified as having its own receiving zone.

Process 310 splits into essentially two parallel operations where process 310 assigns 360 an identifier to each calling group of Points in each calling zone and assigns 370 an identifier to each receiving group of Points in each receiving zone. Specifically, process 310 determines whether each group of Points is a member of each identified local zone. An identifier of "1" is assigned to the binary place of the calling area if the group of Points is a member of the zone. An identifier of "0" is assigned to the binary place of the calling area if the group of Points is not a member of the zone. A person of ordinary skill in the art will appreciate that although operations 360 and 370 are described herein sequentially, both operations may be performed concurrently by process 310.

Next, process 310 concatenates 380 the identifier for each calling group of Points and for each receiving group of Points in each zone (i.e., calling zone and receiving zone). The identifiers are concatenated corresponding to each of the calling group of Points and associated receiving group of Points generating a combined concatenated identifier for each group of Points. Then, process 310 counts 390 for statistical purposes either the number of identifiers obtained for each calling group of Points and for each receiving group of Points in each of the zones or the combined concatenated identifier. Furthermore, process 310 may also convert 390 the identifiers obtained for each Point in each calling group of Points in each of the calling zones, the identifiers obtained for each Point in each receiving group of Points in each of the receiving zones, or the combined concatenated identifier into human understandable identifiers, thereby allowing CLECs and/or users to easily understand and read the identifiers accorded to each Point.

Process 310 proceeds to generate 400 the local calling rules using the combined concatenated identifier corresponding to each group of Points applying conventional local calling rule generation methods. Process 310 then stores and transfers 410 the local calling rules to the Rule Database of Rating Engine 22. Process 310 loops back to retrieve 320 each Point.

Process 310 provides many degrees of freedom to accept and process many local zones. Although the numbering system used in the description of the algorithm is the binary system, any numeric system can be used such as the decimal system. Further, any kind of representation, for instance, using dimensions in space permits the algorithm to function. Thus, if the algorithm generates three local zones, then either three decimal places, three binary places, or three-dimensional spaces are then created thereby providing many degrees of freedom. Further, process 310 can process and store complex calling rules for all the U.S.A. and even the whole world without having to acquire expensive hardware as the present ILEC systems.

Once the local zones and rules are generated, the CCMI, for instance, may provide modifications or updates to the relevant information. To update the relevant information encompasses a tremendous amount of cost and implementation by current CLEC systems. However, the Local Zone Configuration Tool 20 dynamically triggers an updating process processing changes or updates to the relevant information. This updating process allows having a system that is efficient and accurate thereby saving time and money not only to CLECs but to consumers as well.

Figure 7:
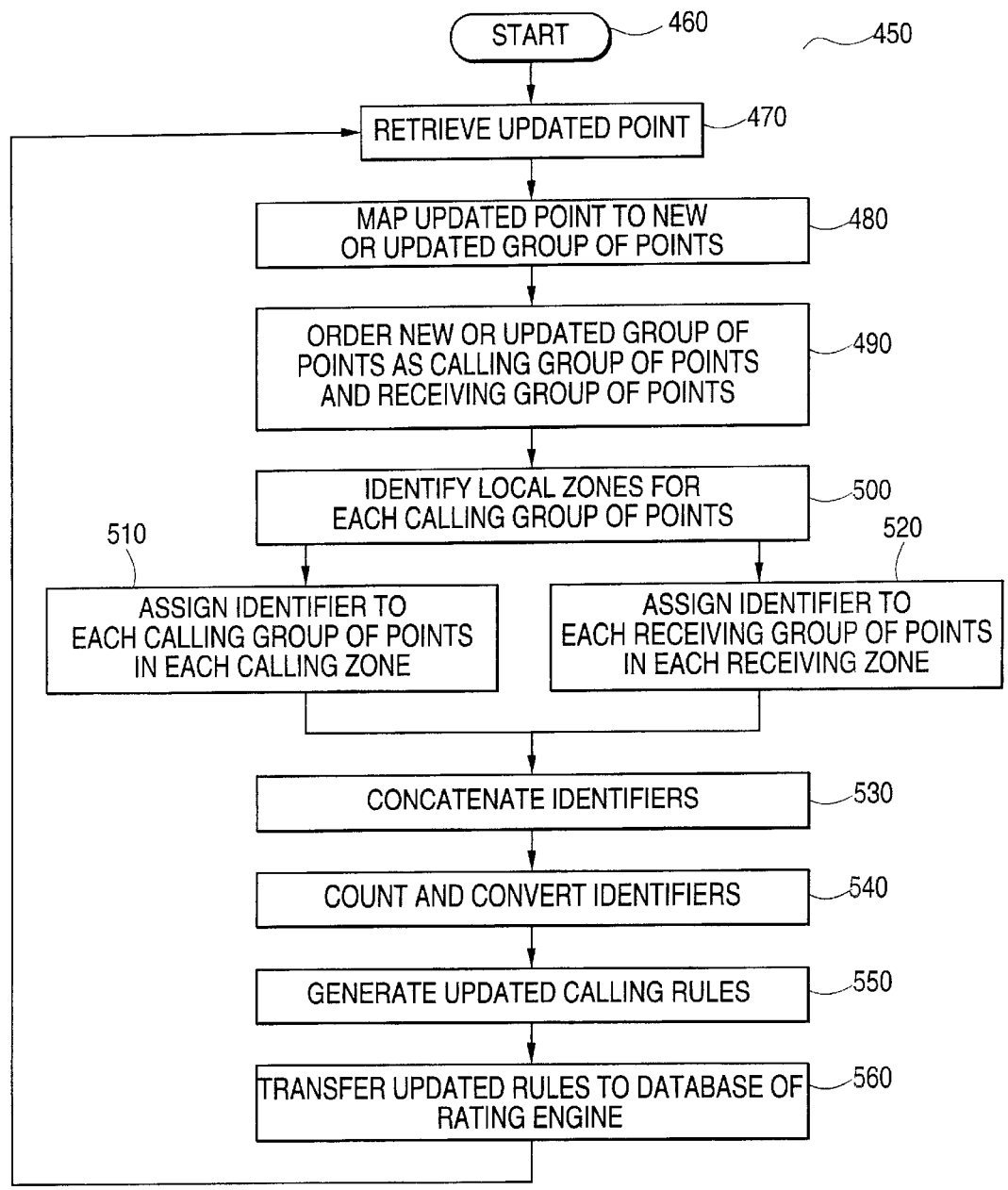
FIG. 7 is a diagram illustrating a process updating the local zones and the assignment of identifiers presented in FIG. 6.

FIG. 7 is a diagram illustrating a process 450 updating the local zones and the assignment of identifiers presented in FIG. 6. Process 450 starts 460 by clearing memories, setting initial flag conditions, etc., as is well known in the art. Process 450 then retrieves 470 an updated Point from Database 18 and maps 480 each updated Point to a new or existing group of Points (e.g., group of Points D in FIG. 3). Next, process 450 orders 490 each new or existing group of Points as calling group of Points and receiving group of Points and tabulates each group of Points as calling group of Points and receiving group of Points.

Subsequently, process 450 identifies 500 each local zone as a calling zone and as a receiving zone. Process 450 splits into essentially two parallel operations where an identifier is assigned 510 to each calling group of Points in each calling zone and an identifier is assigned 520 to each receiving group of Points in each receiving zone. A person of ordinary skill in the art will appreciate that although operations 510 and 520 are described herein sequentially, both operations may be performed concurrently by process 450. Next, process 450 concatenates 530 the identifiers for each calling group of Points and for each receiving group of Points in each calling zone and in each receiving zone. The identifiers are concatenated corresponding to each of the calling group of Points and associated receiving group of Points generating a combined concatenated identifier for each group of Points.

Process 450 proceeds to count 540 the number of distinct identifiers obtained for each calling group of Points and for each receiving group of Points in each calling zone and in each receiving zone or the combined concatenated identifier. Furthermore, process 450 may also convert 540 the identifiers obtained for each Point in each calling group of Points in the calling zones, the identifiers obtained for each Point in each receiving group of Points in each of the receiving zones, or the combined concatenated identifier into human understandable identifiers, thereby allowing CLECs and/or users to easily understand and read the identifiers accorded to each Point. Then, process 450 generates 550 updated local calling rules using the combined concatenated identifier corresponding to each group of Points and stores and transfers 560 the local calling rules to the Rule Database of Rating Engine 22. Process 450 loops back to retrieving 470 an updated Point.

When the system is updated, the updates would be incorporated and would override the defining characteristics of the specific component contained in the Rule Database of Rating Engine 22. Further, the database containing relevant information about the Points may add groups of Points in addition to the groups of Points already provided for. In contrast to the presently implemented systems, system 16 offers flexibility to dynamically update a new group of Points and update the identifiers of the existing groups of Points and assign an identifier to the new group of Points. If a group of Points is added, new zones are also created. A person of ordinary skill in the art can appreciate that even though new zones are added to the system, generating and updating the zones and calling rules can be performed faster than generating and updating each calling rule for each Point.

The above embodiments are described as using various languages and protocols, such as Java, XML, C++, Perl, Visual Basic, etc. However, the present invention is not limited to these languages and protocols, and others can be used. Further, although the present invention is described as a dynamic local zone configuration system in a billing system, different systems may be used. For instance, the algorithm may be applied to a database that determines the quality of service of a Point of Presence that the customer is connected to with an IP connection.

Although the present embodiment describes the relationship between Points in a local calling area, system 16 may process any type of network relationships between the Points such as free calling area, pricing between Points, quality of level of service connection, acts between Points, where acts are forwarding calls, having special ring when called, and/or being on the same billing statement. Specifically, system 16 may process and determine whether calling from Point P1 to Point P2 is free, whether calling from Point P1 to Point P2 costs $0.10, or whether Point P1 and Point P2 have good level of service when connected. In the event the quality of level of service between Points is desired, rather than determining local zones, system 16 would be determining level of service zones and assigning identifiers to each group of Points in each level of service zone.

In this instance, the system 16 would not be determining the zones based on the originating group of Points and receiving group of Points but the algorithm would be determining the zones based on the quality of service of various providers. Rather than focusing on local calling areas, the algorithm would determine the zones and generate rules based on quality of service parameters or space. For instance, the system would generate an Internet access plan that provides users access to high quality of service systems. The quality of service would be provided in a database, for instance, such the Database of Relevant Information about Points 18 as described above.

Further, the signal strengths in cellular phones could also be provided in a database format and where system 16 would then assign identifiers depending on the different levels of signal strengths available. In this instance, system 16 would determine the identifier at the time the user used the data service, and would generate a set of rules that would rate the quality of service the user received. System 16 would dynamically rate the service to the user based on the quality of service while the user is roaming on a provider's network.

System 16 may further solve problems of Local Number Portability in any billing system by allowing to rate solely based on the identifier and not the NPA-NXX, which is not an accurate indication of the geographical location of the user. Further, system 16 may also provide rating in Mobile Telephony. System 16 would calculate an identifier for each cell number and assign an identifier to the user as the user is roaming across the network thereby permitting efficient real time rating.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
   a group of point mapping unit dynamically mapping one or more paints to one or more groups of points;
   a zone creator unit dynamically identifying the one or more groups of points having same calling areas and dynamically generating therefrom one or more local zones;
   an assignment unit dynamically assigning an identifier to each group of points in each zone; and
   a rule generator dynamically generating local calling rules by concatenating the identifier assigned to the calling group of points in each calling zone and the identifier assigned to the receiving group of points in each receiving zone.

2. The apparatus as recited in claim 1, wherein the rule generator dynamically counts a number of identifiers obtained for each calling group of point and for each receiving group of points in each zone or the concatenated identifiers and dynamically converts at least one of the identifier assigned to the calling group of points in each calling zone, the identifier assigned to the receiving group of points in each receiving zone, and the concatenated identifier into a human readable identifier.

3. The apparatus as recited in claim 2, further comprising a business logic module dynamically updating the one or more groups of points, the one or more local zones, the identifier to each group of points in each zone, and the local calling rules.

4. The apparatus as recited in claim 1, wherein the points are one of telephone numbers, cable numbers, and IP address numbers.

5. The apparatus as recited in claim 1, wherein the calling areas are one of geographical areas, domains, and destinations.

6. An apparatus, comprising:
   a group of points mapping unit mapping one or more points to one or more groups of points;
   a zone creator unit identifying the one or more groups of points having same calling areas and generating therefrom one or more local zones;
   an assignment unit assigning an identifier to each group of points in each zone; and
   a rule generator generating local calling rules by concatenating the identifier assigned to the calling group of points in each calling zone and the identifier assigned to the receiving group of points in each receiving zone.

7. The apparatus as recited in claim 6, wherein the rule generator counts a number of identifiers obtained for each calling group of points and for each receiving group of points in each zone or the concatenated identifiers and converts at least one of a identifier assigned to the calling group of points in each calling zone, the identifier assigned to the receiving group of points in each receiving zone and the concatenated identifier into a human readable identifier.

8. The apparatus as recited in claim 7, further comprising a business logic module updating The one or more groups of points, the one or mare local zones, the identifier to each group of point in each zone, and the local calling rules.

9. The apparatus as recited in claim 6, wherein the points are one of telephone numbers, cable numbers, and IP address numbers.

10. The apparatus as recited in claim 6, wherein the calling areas are one of geographical areas, domains, and destinations.

11. An apparatus, comprising:
    a group of points mapping unit dynamically mapping and updating one or more points to one or more groups of points;
    a zone creator unit dynamically identifying and updating the one or more groups of points having same calling areas and dynamically generating therefrom one or more local zones;
    an assignment unit dynamically assigning and updating an identifier to each group of points in each zone; and
    a rule generator dynamically generating and updating local calling rules by concatenating the identifier assigned to the calling group of points in each calling zone and the identifier assigned to the receiving group of points in each receiving zone.

12. The apparatus as recited in claim 11, wherein the rule generator dynamically counts and updates a number of identifiers obtained for each calling group of points and for each receiving group of points in each zone or the concatenated identifiers and dynamically converts end updates at least one of the identifier assigned to the calling group of points in each calling zone, the identifier assigned to the receiving group of points in each receiving zone, and the concatenated identifier into a human readable identifier.

13. The apparatus as recited in claim 11, wherein the points are one of telephone numbers, cable numbers, and IP address numbers.

14. The apparatus as recited in claim 11, wherein the calling areas are one of geographical areas, domains, and destinations.

15. An apparatus, comprising:
    a group of points mapping unit mapping and updating one or more points to one or more groups of points;
    a zone creator unit identifying and updating the one or more groups of points having same calling areas and dynamically generating therefrom one or more local zones; and
    a rule generator dynamically generating and updating local calling rules by concatenating an identifier assigned to the calling group of points in each calling zone and an identifier assigned to the receiving group of points in each receiving zone.

16. The apparatus as recited in claim 15, wherein the rule generator dynamically counts and u dates a number of identifiers obtained for each calling calling group of points and for each receiving group of points in each zone or the concatenated identifiers and dynamically converts and updates at least one of the identifier assigned to the points in each receiving zone, and the concatenated identifier into a human readable identifier.

17. The apparatus as recited in claim 15, wherein the points are one of telephone numbers, cable numbers, and IP address numbers.

18. The apparatus as recited in claim 15, wherein the calling areas are one of geographical areas, domains, and destinations.

19. An apparatus, comprising;
a retrieving unit dynamically retrieving one or more points from a database, wherein the points are one of telephone numbers, cable numbers, and IP address numbers;
a group of points mapping unit dynamically mapping the one or more points to one or more groups of points and dynamically ordering each group of points to a calling group of points and a receiving group of points;
a zone creator unit dynamically identifying the one or more groups of points having same calling areas, dynamically generating therefrom one or more local zones comprising one or more calling zones and one or more receiving zones, wherein the calling areas are one of geographical areas, domains, and destinations and the at least one local zone;
an assignment unit dynamically assigning an identifier to each calling group of points in each calling zone and dynamically assigning an identifier to each receiving group of points in each receiving zone;
a rule generator dynamically generating local calling rules by concatenating the identifier assigned to the calling group of points in each calling zone and the identifier assigned to the receiving group of points in each receiving zone, dynamically counting a number of identifiers in the concatenated identifier, and dynamically converting at least one of the identifier assigned to the calling group of points in each calling zone, the identifier assigned to the receiving group of points in each receiving zone, and the concatenated identifier into a human readable identifier;
a data transfer unit transferring the local calling rules to a rule database for billing purposes; and
storage storing The one or more groups of points, the one or more calling zones, the one or more receiving zones, the identifier assigned to each calling group of points in each calling zone, the identifier assigned to each receiving group of points in each receiving zone, and The local calling rules.

20. The apparatus as recited in claim 19, wherein each calling zone comprises at least one of a calling group of points having at least one receiving group of points and two or more calling groups of points having at least one and same receiving groups of points.

21. The apparatus as recited in claim 19, wherein each receiving zone comprises at least one of one or more receiving groups of points of a calling group of points different from one or more receiving groups of points of another calling group of points and one or more receiving groups of points of two or more calling groups of points having the same one or more receiving groups of points.

22. The apparatus as recited in claim 19, wherein the group of points further dynamically orders The calling group of points and the receiving group of points using a horizontal connection ordering and a vertical connection ordering.

23. The apparatus as recited in claim 19, further comprising a business logic module dynamically updating the one or more groups of points, the one or more calling zones, the one or more receiving zones, the identifier assigned to each calling group of points in each calling zone, the identifier assigned to each receiving group of points in each receiving zone, and the local calling rules.

24. A method performed by a processor in a system, comprising:
mapping, dynamically, one or more points to one or more groups of points;
identifying, dynamically, the one or more groups of points having same calling areas, dynamically generating therefrom one or more local zones comprising one or more calling zones and or more receiving zones;
assigning, dynamically, an identifier to each group of points; and
generating, dynamical local calling rules by identifier assigned to the calling group of points in each calling zone and an identifier assigned to the receiving group of points in each receiving zone.

25. The method as recited In claim 24, wherein the identifier is assigned to each group of points in one or more local zones.

26. The method as recited in claim 25, further comprising counting, dynamically, a number of identifiers obtained for each calling group of points and for each receiving group of points in each zone or the concatenated identifiers and converting, dynamically, at least one of the identifier assigned to the calling group of points in each calling zone, the identifier assigned to the receiving group of points in each receiving zone, and the concatenated identifier into a human readable identifier.

27. The method as recited in claim 26, further comprising updating, dynamically, the one or more groups of points, the one or more local zones, the identifier to each group of points in each zone, and the local calling rules.

28. A method performed by a processor in a system, comprising:
mapping, dynamically, one or more points to one or more groups of point;
identifying, dynamically, the one or more groups of points having same calling areas and dynamically generating therefrom one or more local zones;
assigning, dynamically, an identifier to each group of points in each zone; and
generating, dynamically, local calling rules by concatenating the identifier assigned to the calling group of points in each calling zone and the identifier assigned to the receiving group of points in each receiving zone.

29. The method as recited in claim 28, further comprising counting, dynamically, a number of identifiers obtained for each calling group of points and for each receiving group of points in each zone or the concatenated identifiers and converting, dynamically, at least one of the identifier assigned to the calling group of points in each calling zone, the identifier assigned to the receiving group of points in each receiving zone, and the concatenated identifier into a human readable identifier.

30. The method as recited in claim 29, further comprising updating, dynamically, the one or more groups of points, the one or more local zones, the identifier to each group of points in each zone, and the local calling rules.

31. A method performed by a processor in a system, comprising:
mapping one or more points to one or more groups of points;

identifying the one or more groups of points having same calling areas and generating therefrom one or more local zones;

assigning an identifier to each group of points in each zone; and generating local calling rules by concatenating the identifier assigned to the calling group of points in each calling zone and the identifier assigned to the receiving group of points in each receiving zone.

32. The method as recited in claim 31 further comprising counting a number of identifiers obtained for each calling group of points and for each receiving group of points in each zone or the concatenated identifiers and converting at least one of the identifier assigned to the ceiling group of points in each calling zone, the identifier assigned to the receiving group of points in each receiving zone, and the concatenated identifier into a human readable identifier.

33. The method as recited in claim 32, further comprising updating the one or more groups of points, the one or more local zones, the identifier to each group of points in each zone, and the local calling rules.

34. A method performed by a processor in a system, comprising:

mapping and updating, dynamically, one or more point to one or more groups of points;

identifying and updating, dynamically, the one or more groups of points having same calling areas and dynamically generating therefrom one or more local zones; and assigning and updating, dynamically, an identifier to each group of points in each zone; and generating and updating, dynamically, local calling rules by concatenating the identifier assigned to the calling of points in each calling zone and the identifier assigned to the receiving group of points in each receiving zone.

35. The method as recited in claim 34, further comprising counting and updating, dynamically, a number of identifiers obtained for each calling group of points and for each receiving group of points in each zone or the concatenated identifiers and converting and updating, dynamically, at least one of the identifier assigned to the calling group of points in each calling zone, the identifier assigned to the receiving group of points in each receiving zone, and the concatenated identifier into a human readable identifier.

36. A method performed by a processor in a system, comprising:

mapping and updating one or more points to one or more groups of points;

identifying and updating the one or more groups of points having same calling areas and dynamically generating therefrom one or more local zones; and generating and updating local calling rules by concatenating an identifier assigned to the calling group of points in each calling zone and an identifier assigned to the receiving group of points in each receiving zone.

37. The method as recited in claim 36, further comprising counting and updating a number of identifiers obtained for each calling group of points and for each receiving group of points in each zone or me concatenated identifiers and converting and updating at least one of the identifier assigned to the calling group of points in each calling zone, the identifier assigned to the receiving group of points in each receiving zone, and the concatenated identifier into a human readable identifier.

38. A method performed by a processor in a system, comprising:

retrieving, dynamically, one or more points from a database, wherein the points are one of telephone numbers, cable numbers, and IP address numbers;

mapping, dynamically, the one or more points to one or more groups of points;

ordering, dynamically, each group of points to a calling group of points and a receiving group of points;

identifying, dynamically, the one or more groups of points having same calling areas, dynamically generating therefrom one or more local zones comprising one or more calling zones and one or more receiving zones, wherein the ceiling areas are one of geographical areas, domains, and destinations and the at least one local zone;

assigning, dynamically, an identifier to each calling group of points in each calling zone;

assigning, dynamically, an identifier to each receiving group of points in each receiving zone;

generating, dynamically local calling rules by concatenating the Identifier assigned to the calling group of points in each calling zone and the identifier assigned to the receiving group of points in each receiving zone;

counting, dynamically, a number of identifiers in the concatenated identifier;

converting, dynamically, at least one of the identifier assigned to the calling group of points in each calling zone, the identifier assigned to the receiving group of points in each receiving zone, and the concatenated identifier into a human readable identifier;

transferring the local calling rules to a rule database for billing purposes;

storing the one or more groups of points, the one or more calling zones, the one or more receiving zones, the identifier assigned to each calling group of points in each calling zone, the identifier assigned to each receiving group of points in each receiving zone, and the local calling rules; and updating, dynamically, the one or more groups of points, the one or more calling zones, the one or more receiving zones, the identifier assigned to each calling group of points in each calling zone, the identifier assigned to each receiving group of points in each receiving zone, and the local calling rules.

39. The method as recited in claim 38, further comprising ordering, dynamically, the calling group of points and the receiving group of points using a horizontal connection ordering and a vertical connection ordering.

40. A computer readable storage controlling a computer and comprising a process of mapping, dynamically, one or more points to one or more groups of points; identifying, dynamically, the one or more groups of points having same calling areas, dynamically generating therefrom one or more local zones comprising one or more calling zones and one or more receiving zones; assigning, dynamically, an identifier to each group of points; and generating, dynamically, local calling rules by concatenating the identifier assigned to the calling group of points in each calling zone and the identifier assigned to the receiving group of points in each receiving zone.

41. The computer readable storage as recited in claim 40, wherein the identifier is assigned to each group of points in one or more local zones.

42. The computer readable storage as recited in claim 41, further comprising counting, dynamically a number of identifiers obtained for each calling group of points and for each receiving group of points in each zone or the concatenated identifiers and converting, dynamically, at least one of the identifier assigned to the calling group of points in each calling zone, the identifier assigned to each group of points of each group of points in each receiving zone, and the concatenated identifier into a human readable identifier.

43. The computer readable storage as recited in claim 40, further comprising updating, dynamically, the one or more groups of points, the one or more local zones, the identifier to each group of points in each zone, and the local calling rules.

44. A computer readable storage controlling a computer and comprising a process of mapping, dynamically, one or more points to one or more groups of points; identifying, dynamically, the one or more groups of points having same calling areas and dynamically generating therefrom one or more local zones; and-assigning, dynamically, an identifier to each group of points in each zone; and generating, dynamically, local calling rules by concatenating the identifier assigned to the calling group of points in each calling zone and the identifier assigned to the receiving group of points in each receiving zone.

45. The computer readable storage as recited in claim 44, further comprising counting, dynamically, a number of identifiers obtained for each calling group of paints and for each receiving group of points in each zone or the concatenated identifiers and converting, dynamically, at least one of the identifier assigned to the calling group of points in each calling zone, the identifier assigned to the receiving group of point in each receiving zone, and the concatenated identifier into a human readable identifier.

46. The computer readable storage as recited in claim 45, further comprising updating, dynamically, the one or more groups of points, the one or more local zones, the identifier to each group of points in each zone, and the local calling rules.

47. A computer readable storage controlling a computer and comprising a process of mapping one or more points to one or more groups of points; identifying the one or more groups of points having same calling areas and generating therefrom one or more local zones; assigning an identifier to each group of points in each zone; and generating local calling rules by concatenating the identifier assigned to the calling group of points in each calling zone and the identifier assigned to the receiving group of points in each receiving zone.

48. The computer readable storage as recited in claim 41 further comprising counting a number of identifiers obtained for each calling group of points and for each receiving group of points in each zone or the concatenated identifiers and converting at least one of the identifier assigned to the calling group of points in each calling zone, the identifier assigned to the receiving group of points in each receiving zone, and the concatenated identifier into a human readable identifier.

49. The computer readable storage as recited in claim 48, further comprising updating the one or more groups of points, the one or mare local zones, the identifier to each group of points in each zone, and the local calling rules.

50. A computer readable storage controlling a computer and comprising a process of mapping and updating, dynamically, one or more points to one or more groups of points; identifying and updating, dynamically, the one or more groups of points having same calling areas and dynamically generating therefrom one or more local zones; assigning and updating, dynamically, an identifier to each group of points in each zone; and generating and updating, dynamically, local calling rules by concatenating the identifier assigned to the calling group of points in each calling zone and the identifier assigned to the receiving groups of points in each receiving zone.

51. The computer readable storage as recited in claim 50 further comprising counting and updating a number of identifiers obtained for each calling group of points and for each receiving group of points in each zone or the concatenated identifiers and converting and updating, dynamically, at least one of the identifier assigned to the calling group of points in each calling zone, the identifier assigned to the receiving group of points in each receiving zone, and the concatenated identifier into a human readable identifier.

52. A computer readable storage controlling a computer and comprising a process of mapping and updating one or more points to one or more groups of points; identifying and updating the one or more groups of points having same calling areas and dynamically generating therefrom one or more local zones; and generating and updating local calling rules by concatenating an identifier assigned to the calling group of points in each calling zone and an identifier assigned to the receiving group of points in each receiving zone.

53. The computer readable storage as recited in claim 52, further comprising counting and updating a number of identifiers obtained for each calling group of points and for each receiving group of points in each zone or the concatenated identifiers and converting and updating at least one of the identifier assigned to the calling group of points in each calling zone, The identifier assigned to the receiving group of points in each receiving zone, and the concatenated identifier into a human readable identifier.

54. A computer readable storage controlling a computer and comprising a process of retrieving, dynamically, one or more points from a database, wherein the points are one of telephone numbers, cable numbers, and IP address numbers; mapping, dynamically, the one or more points to one or more groups of points: ordering, dynamically, each group of points to a calling group of points and a receiving group of points; identifying, dynamically, the one or more groups of points having same calling areas, dynamically generating therefrom one or more local zones comprising one or more calling zones and one or more receiving zones, wherein the calling areas are one of geographical areas, domains, and destinations end the at least one local zone; assigning, dynamically, an identifier to each calling group of points in each calling zone; assigning, dynamically, an identifier to each receiving group of points in each receiving zone; generating, dynamically, local calling rules by concatenating the identifier assigned to the calling group of points in each calling zone and the identifier assigned to the receiving group of points in each receiving zone; counting, dynamically, a number of Identifiers in the concatenated identifier, converting, dynamically at least one of the identifier assigned to the calling group of points in each calling zone, the identifier assigned to the receiving group of points in each receiving zone, and the concatenated identifier into a human readable identifier; transferring the local calling rules to a rule database for billing purposes; storing the one or more groups of points, the one or more calling zones, the one or more receiving zones, the identifier assigned to each calling group of points in each calling zone, the identifier assigned to each receiving group of paints in each receiving zone, and the local calling rules; and updating, dynamically, the one or more groups of points, the one or more calling zones, the one or more receiving zones, the identifier assigned to each calling group of points in each calling zone, the identifier assigned to each receiving group of points in each receiving zone, and the local calling rules.

55. The computer readable storage as recited in claim 54, further comprising ordering, dynamically the calling group of points and the receiving group of points using a horizontal connection ordering and a vertical connection ordering.

* * * * *

UNITED STATES PATENT AND TRADEMARK OFFICE
CERTIFICATE OF CORRECTION

PATENT NO. : 6,721,761 B2
DATED : April 13, 2004
INVENTOR(S) : Balazs Nagy et al.

It is certified that error appears in the above-identified patent and that said Letters Patent is hereby corrected as shown below:

Column 4,
Line 60, change "NPANXX" to -- NPA-NXX --.

Column 17,
Line 28, change "paints" to -- points --.
Line 42, change "point" to -- points --.

Column 18,
Line 9, change "a" to -- the --.
Line 11, after "zone" insert --, --.
Line 14, change "The" to -- the --.
Line 16, change "point" to -- points --.
Line 66, change "u dates" to -- updates --.

Column 19,
Line 1, delete "calling" second occurrence.
Line 4, after second "the" insert -- calling group of points in each calling zone, the identifier assigned to the receiving group of --.
Lines 46, 50 and 65, change "The" to -- the --.

Column 20,
Line 15, after "and" insert -- one --.
Line 18, after "rules by" insert -- concatenating an --.
Line 18, change "dynamical" to -- dynamically, --.
Line 22, change "In" to -- in --.
Line 41, change "point" to -- points --.

Column 21,
Line 10, after "31" insert --, --.
Line 14, change "ceiling" to -- calling --.
Line 24, change "point" to -- points --.
Line 32, after "calling" insert -- group --.

Column 22,
Line 17, change "Identifier" to -- identifier --.
Lines 36-37, delete the paragraph break.

UNITED STATES PATENT AND TRADEMARK OFFICE
CERTIFICATE OF CORRECTION

PATENT NO. : 6,721,761 B2
DATED : April 13, 2004
INVENTOR(S) : Balazs Nagy et al.

It is certified that error appears in the above-identified patent and that said Letters Patent is hereby corrected as shown below:

Column 23,
Lines 1-2, after "to" delete "each group of points of each" and insert -- the receiving --.
Line 14, delete "and".
Line 22, change "paints" to -- points --.
Line 27, change "point" to -- points --.
Line 43, change "41" to -- 47 --.
Line 54, change "mare" to -- more --.

Column 24,
Line 24, change "The" to -- the --.
Line 39, change "end" to -- and --.
Line 47, change "Identifiers" to -- identifiers --.
Line 57, change "paints" to -- points --.

Signed and Sealed this

Fifteenth Day of February, 2005

JON W. DUDAS
*Director of the United States Patent and Trademark Office*